United States Patent
Moe et al.

(10) Patent No.: US 12,254,077 B2
(45) Date of Patent: Mar. 18, 2025

(54) METHOD AND APPARATUS FOR GENERATING ARTIFICIAL INTELLIGENCE RESISTANT VERIFICATION IMAGES

(71) Applicant: ADVANCED MICRO DEVICES, INC., Santa Clara, CA (US)

(72) Inventors: Scott Moe, Austin, TX (US); Nicholas Penha Malaya, Austin, TX (US); Sudhanva Gurumurthi, Austin, TX (US); Naman Maheshwari, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1131 days.

(21) Appl. No.: 16/709,224

(22) Filed: Dec. 10, 2019

(65) Prior Publication Data

US 2020/0272726 A1    Aug. 27, 2020

Related U.S. Application Data

(60) Provisional application No. 62/810,024, filed on Feb. 25, 2019.

(51) Int. Cl.
*G06F 7/04* (2006.01)
*G06F 15/16* (2006.01)
(Continued)

(52) U.S. Cl.
CPC ............. *G06F 21/45* (2013.01); *G06F 21/46* (2013.01); *G06N 3/08* (2013.01); *G06T 11/00* (2013.01); *G06F 2221/2133* (2013.01)

(58) Field of Classification Search
CPC .. G06F 21/45; G06F 21/36; G06F 2221/2133; G06T 11/00; G06T 11/80
(Continued)

(56) References Cited

U.S. PATENT DOCUMENTS

2008/0218616 A1*  9/2008  Wenger ................ H04N 5/2351
                                                           348/E3.016
2013/0298195 A1* 11/2013  Liu ......................... G06T 11/60
                                                           726/3

(Continued)

OTHER PUBLICATIONS

Goodfellow, Ian J., et al., "Explaining and Harnessing Adversarial Examples", International Conference on Learning Representations, 2015, 11 pages.

(Continued)

*Primary Examiner* — Jeffrey C Pwu
*Assistant Examiner* — Samuel Ambaye

(57) ABSTRACT

An apparatus includes one or more processors that are configured to determine a pixel-by-pixel bounds for a perturbed image, generate an adversarial example using an adversarial example generation technique, and modify the adversarial example to generate the perturbed image based on the pixel-by-pixel bounds. When an initial perturbed image does not reside within the pixel-by-pixel bounds, the one or more processors adjust the initial perturbed image to generate the perturbed image by a Weber-Fechner based adversarial perturbation to reside within the pixel-by-pixel bounds. The one or more processors provide the perturbed image to a computing device in an image-based Completely Automated Public Turing Test to tell Computers and Humans Apart (CAPTCHA).

20 Claims, 3 Drawing Sheets

(51) Int. Cl.
  *G06F 21/45* (2013.01)
  *G06F 21/46* (2013.01)
  *G06N 3/08* (2023.01)
  *G06T 11/00* (2006.01)
  *H04L 29/06* (2006.01)

(58) Field of Classification Search
  USPC .......................................................... 726/4
  See application file for complete search history.

(56) References Cited

U.S. PATENT DOCUMENTS

2018/0253866 A1* 9/2018 Jain ..................... G06V 10/82
2019/0130110 A1* 5/2019 Lee ..................... G06F 21/57
2020/0089995 A1* 3/2020 Bose ................... G06K 9/6256

OTHER PUBLICATIONS

Moosavi-Dezfooli, Seyed-Mohsen, et al., "DeepFool: A Simple and Accurate Method to Fool Deep Neural Networks", IEEE Conference on Computer Vision and Pattern Recognition, 2016, 9 pages.
Website: https://en.wikipedia.org/wiki/Weber%E2%80%93Fechner_law, accessed Dec. 10, 2019, 8 pages.
Moosavi-Dezfooli, Seyed-Mohsen, et al., "Universal Adversarial Perturbations", IEEE Conference on Computer Vision and Pattern Recognition, 2017, 11 pages.

* cited by examiner

METHOD AND APPARATUS FOR GENERATING ARTIFICIAL INTELLIGENCE RESISTANT VERIFICATION IMAGES

CROSS REFERENCE TO RELATED APPLICATIONS

This application claims priority to the U.S. Provisional Patent Application Ser. No. 62/810,024 filed on Feb. 25, 2019 and entitled "METHOD AND APPARATUS FOR GENERATING ARTIFICIAL INTELLIGENCE RESISTANT VERIFICATION IMAGES," which is hereby incorporated by reference in its entirety.

BACKGROUND

Computer vision (CV) security applications, such as, image-based CAPTCHAs (an acronym for "completely automated public Turing test to tell computers and humans apart"), are used by computer network systems to provide security from spam and artificially intelligent bots. Bots are autonomous programs on networks (especially the Internet) that interact with computer systems. With recent advances in neural networks that target CV applications, such as, for example, convolutional neural networks (CNNs)), artificial intelligence (AI) is being used to subvert such CAPTCHAs, resulting in the creation of CAPTCHAs that are increasingly difficult for humans to visually interpret.

One conventional approach that is used to protect CAPTCHA computer applications from AI systems is to use adversarial instability in the context of neural networks. The Fast Gradient Sign Method (FGS) is a type of adversarial instability method that generates adversarial perturbations that are added to the original image provided to the CAPTCHA in order to cause a neural network to misclassify the image. However, current techniques that use the FGS method often result in images that are so perturbed that humans are unable to classify the images. Another conventional approach that generates adversarial perturbations to fool classifiers (i.e., cause misclassification by the network that prevent AI from accessing restricted applications) is based on an iterative linearization of the classifier, which generates minimal perturbations that are enough to change classification labels. Using iterative linearization generates small perturbations in the input which cause misclassification and is further used to generate unique perturbation vectors which fool the network for a sizable percentage of images in the dataset. However, both the fast gradient sign and iterative linearization approaches often do not provide images that are easy for humans to recognize or visually interpret, when, for example, the adversarial perturbations that are added to the perturbed image are capable of being seen by the viewer of the display in the image-CAPTCHA.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
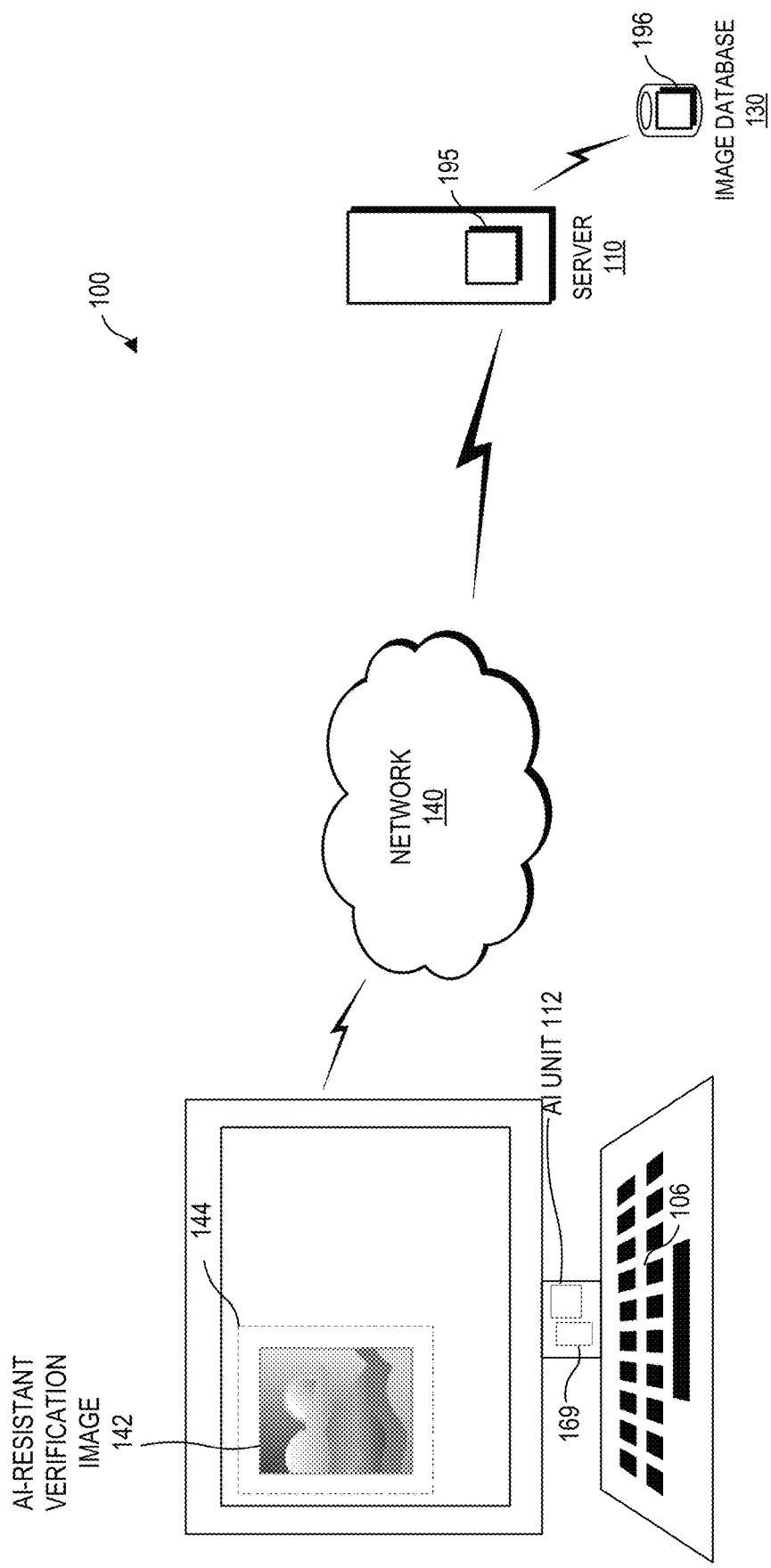
FIG. 1 is a block diagram of an exemplary network environment for implementing an image-based CAPTCHA using artificial intelligence resistant verification images in accordance with some embodiments.
Figure 2:
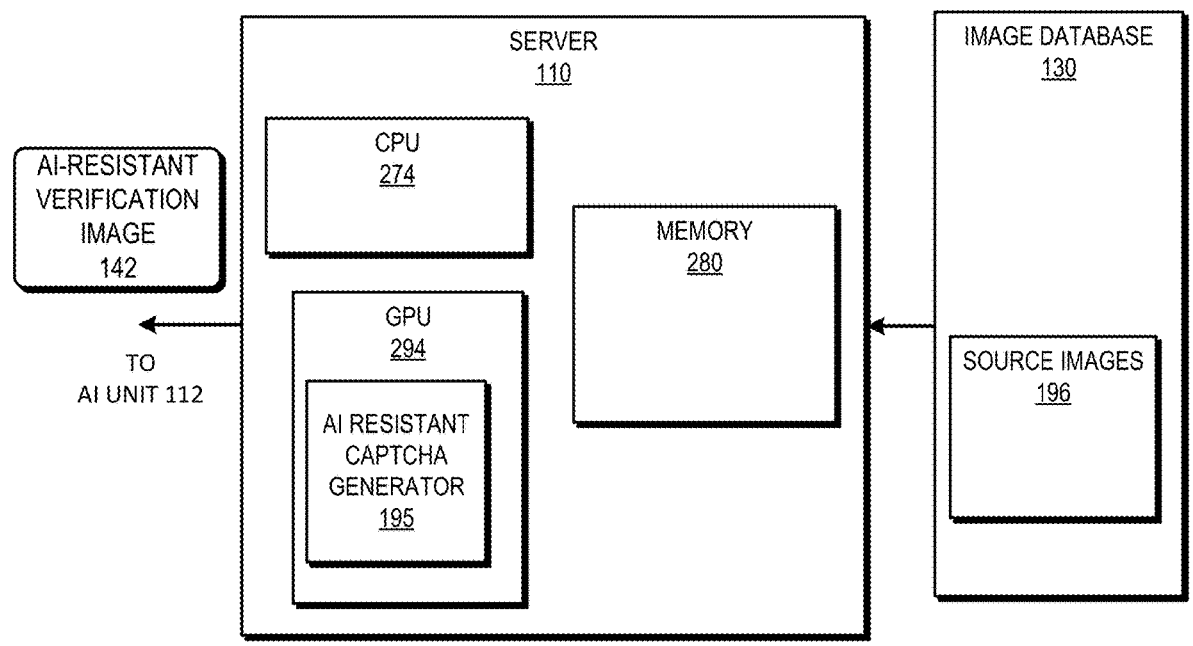
FIG. 2 is a block diagram further illustrating the server and image database of FIG. 1 implementing artificial intelligence resistant verification images in accordance with some embodiments.
Figure 3:
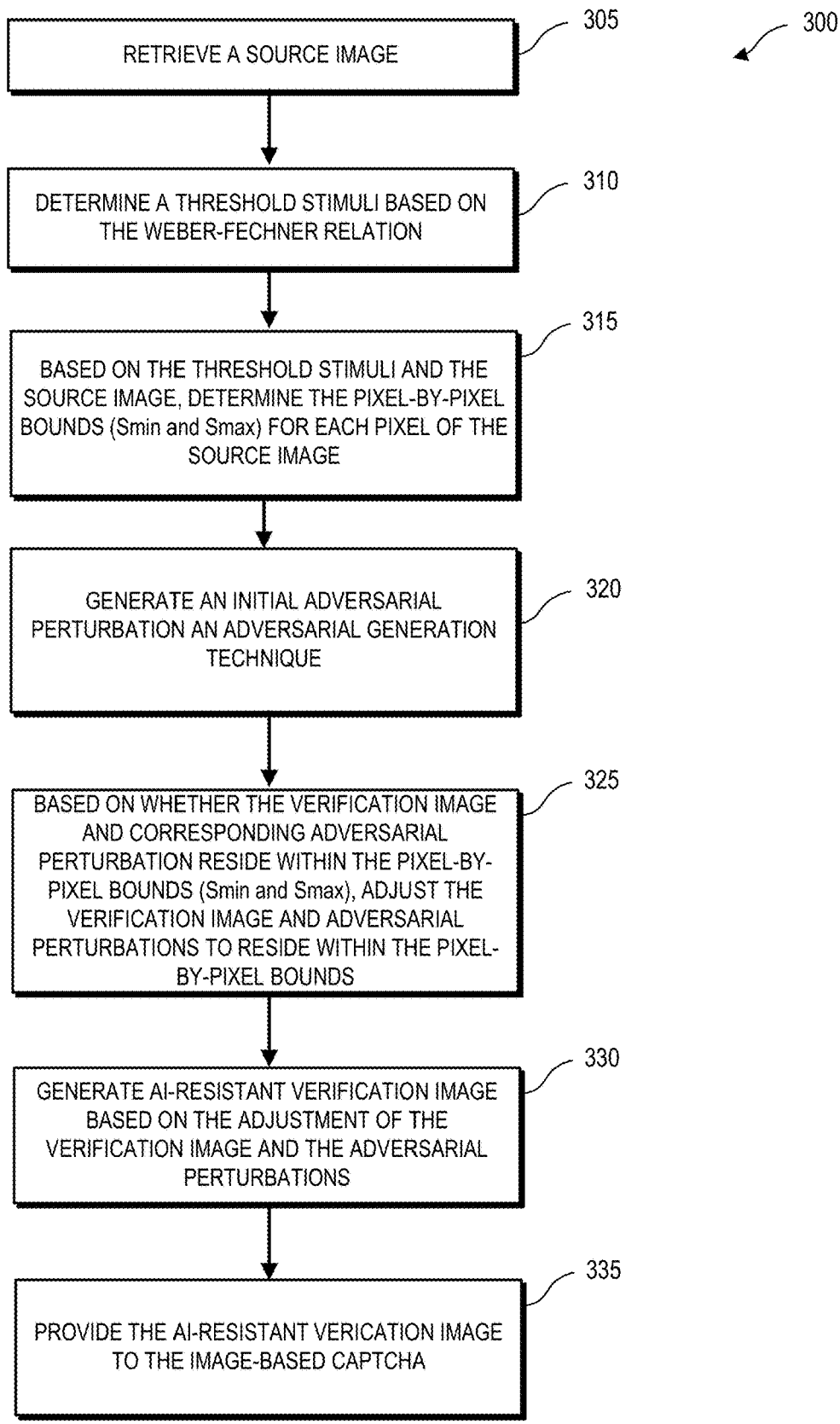
FIG. 3 is a flow diagram illustrating a method for implementing artificial intelligence resistant verification images in the network environment of FIG. 1 and FIG. 2 in accordance with some embodiments.

FIGS. 1-3 illustrate systems and techniques for generating artificial intelligent (AI)-resistant verification images using adversarial perturbations in an image-based CAPTCHA. The AI-resistant verification images are generated using a pixel-by-pixel bounds on each pixel of a source image that places a minimum and maximum threshold value on an adversarial perturbation that is added to each pixel. The adversarial perturbations that are generated using the pixel-by-pixel bounds are based on the limitations of human visual perception (e.g., a "Weber-Fechner" relation described in detail with reference to FIGS. 1-3) and AI image recognition limitations that dictate the perturbation range of the adversarial perturbations.

As used herein, the term verification image refers to an image-based mechanism by which a query is issued to elicit an answer from an end user that enables a determination of whether the end user is a human. The adversarial perturbation is defined as a change or distortion in the image data of the verification image that is deliberately designed to prevent a machine-learning or AI system from correctly classifying the image. The adversarial perturbation that is added to the source image by the data processing system forces the AI system to misclassify the image (i.e., to mistake the image for a different image). The adversarial perturbations thereby prevent the AI network from selecting the correct image while being visually imperceptible to the human eye.

FIG. 1 illustrates an exemplary network environment 100 for implementing an image-based CAPTCHA using artificial intelligence resistant verification images in accordance with some embodiments. In various embodiments, network environment 100 includes a computing device 106, a network 140, a server 110, and an image database 130. In some embodiments, the server 110 provides web pages, web services, and associated data to one or more remote clients via the network 140. At least some of these services and associated data are specified to be secure services and data that are to be secured from unauthorized access. For example, in some embodiments the server 110 provides banking or other financial services to remote users via the network 140, wherein the banking and financial data is expected to be secured from unauthorized access.

For the example illustrated in FIG. 1, the computing device 106 is configured to employ a malicious entity 169, such as malicious software executing at computing device 106, that utilizes an AI unit 169 to attempt to gain unauthorized access to the secure services and data of server 110. Computing device 106 includes a display for displaying an AI-resistant image-identification CAPTCHA 144. Although for the embodiment of FIG. 1, the computing device 106 is depicted as a desktop computer with a display, in some embodiments, computing device 106 is a headless server that communicates with computers and other devices via a network, a cellular-phone, a tablet, or other computing device that is used to access software services and applications from server 110 via network 140. In various embodiments, network 140 is any type of communication network, such as, for example, wireless networks (e.g., cellular or satellite), wire-based networks (e.g., cable), cellular telecommunication networks, and IP-based telecommunication network(s) (e.g., Voice over Internet Protocol networks). In other implementations, the network(s) 140 also include traditional landline networks, or combinations thereof.

In some embodiments, AI unit 112 is an artificially intelligent autonomous program executing on computing device 106 that, used in conjunction with the malicious entity 169, is designed to gain unauthorized access to computer systems on network 140 (e.g., server 110). AI unit 112 essentially serves as an image classification system that utilizes artificial intelligence to attempt to correctly classify an AI-resistant verification image 142 presented in AI-resistant image-identification CAPTCHA 144. In different embodiments, AI unit 112 is hardware, software, or a combination thereof, that utilizes convolutional neural network (CNNs), recurrent neural networks (RNN), or other artificially intelligent self-learning software operating program to access and analyze services and applications provided by server 110 via network 140. For example, in some embodiments, the AI unit 112 is a neural network that has been trained to classify image data provided by servers connected to the network 140 in order to identify conventional CAPTCHA images. The malicious entity 169 executing at the computing device 110 uses the classified images to provide a response (referred to herein as a CAPTCHA response) to access secure services and data.

To illustrate generally, in order to access secure data, malicious entity 169 at the computing device 106 sends, via the network 140, a request to the server 110 that stores the secure data. In response, the server 110 sends a set of CAPTCHA images to the server 110 for identification. To access the secure data, the malicious entity 169 must properly identify a specified subset of the CAPTCHA images, such as identifying all the images with a specified feature, and provide a CAPTCHA response indicating the specified subset. The malicious entity 169 employs the AI unit 112 to identify the images having the specified feature, and thus to generate the CAPTCHA response to access the secure data. To prevent unauthorized access to the secure data and services from such unauthorized access by the entity employing the AI unit 112, server 110 includes an AI-resistant CAPTCHA generator 195 configured to generate the AI-resistant image-identification CAPTCHA 144.

During an attempt to gain unauthorized access to server 110 by computing device 106, server 110 receives, via network 140, an autonomous service request from computing device 106 to utilize services or applications provided by server 110. In various embodiments, the autonomous service request is from the malicious entity 169 that employs AI-unit 112 of computing device 106. For example, in different embodiments the autonomous service request is a request to access secure data (e.g. a web page, user data, and the like) stored at the server 110. To prevent the unauthorized access to the secure data, AI-resistant CAPTCHA generator 195 of server 110 presents the AI-resistant image-identification CAPTCHA 144 to computing device 106.

In order to present the AI-resistant image-identification CAPTCHA 144, AI-resistant CAPTCHA generator 195 generates an AI-resistant verification image 142 that is based on a Weber-Fechner relation that limits the perceptibility of an adversarial perturbation that is being added to source image 196 to generate the AI-resistant verification image 142. The Weber-Fechner relation (discussed further in detail below with reference to FIGS. 2-3) is a human perception visual relationship that expresses the perceived intensity of the image as being proportional to the logarithm of the actual intensity of the image. The Weber-Fechner relation allows AI-resistant CAPTCHA generator 195 to generate the AI-resistant verification image 142 by providing a threshold by which a human cannot perceive the adversarial perturbation that is added to the source image 196. That is, the adversarial perturbation is not perceivable by a human user, but is perceivable by the AI unit 112.

In order to generate AI-resistant verification image 142 and the corresponding adversarial perturbation value by which each pixel of the source image 196 is to be distorted, the AI-resistant CAPTCHA generator 195 is configured to generate a pixel-by-pixel bounds for each pixel of the source image 196. The pixel-by-pixel bounds is a limitation for each pixel of the source image 196 that represents the maximum and minimum amount by which each pixel can be distorted. The maximum value is calculated by AI-resistant CAPTCHA generator 195 using source image 196 and a threshold stimuli, which forms the intensity change threshold by which a human cannot perceive the distortion that is generated using the Weber-Fechner relation. The minimum value of the pixel-by-pixel bound is calculated by the AI-resistant CAPTCHA generator 195 also utilizing the threshold stimuli of the Weber-Fechner relation that is used to generate the maximum value. The derivation of the minimum and maximum threshold values of the pixel-by-pixel bounds is described further in detail below with reference to FIG. 2.

After the pixel-by-pixel bounds has been generated by the AI-resistant CAPTCHA generator 195, the AI-resistant CAPTCHA generator 195 uses a standard adversarial example generation technique, that includes an adversarial perturbation generation technique, to generate an initial value of the adversarial perturbation, and, in some embodiments, a corresponding initial AI-resistant verification image. An adversarial example is an image with intentional pixel adversarial perturbations that causes a classification system to make a false classification. In some embodiments, AI-resistant CAPTCHA generator 195 uses at least one of the following adversarial perturbation generation techniques to generate the adversarial example: the Fast Gradient Sign Method (FGSM), the Deep Fool Method (DFM), or the Jacobian-based Saliency Map Attack (JSMA). For illustrative purposes of some of the embodiments, the FGSM is used to provide an initial approximation of the adversarial perturbation values for each pixel of the source image 196, although, either of the DFM method or JSMA adversarial perturbation generation techniques can be used to determine the initial approximation of the adversarial perturbation values for each pixel of the source image 196.

The perturbation values provided by the standard adversarial perturbation generation technique are than adjusted based upon the minimum and maximum values provided by AI-resistant CAPTCHA generator 195. Thus, a first adversarial perturbation (and corresponding AI-resistant verification image) is generated using a standard method of generating perturbations (i.e., a standard adversarial perturbation generation technique). Then, using the pixel-by-pixel bounds, the first adversarial perturbation (and corresponding AI-resistant verification image) is adjusted to ensure that the perturbation lies within the minimum value and maximum threshold values to ensure that the perturbation is not visible by a human. Thus, the AI-resistant CAPTCHA generator 195 relies on the generation of the minimum and maximum threshold values to limit the selection of the adversarial perturbation to perturbation values that generate an AI-resistant verification image 142 that are both recognizable by a human user of the AI-resistant image-identification CAPTCHA 144 and prevent the AI unit 112 from accessing the services provided by server 110.

After generation of the AI-resistant verification image 142 by AI-resistant CAPTCHA generator 195, the AI-resistant verification image 142 is provided as part of the AI-resistant image-identification CAPTCHA 144 to malicious entity 169 of computing device 106. Because of the adversarial perturbations included in the image 142, AI unit 112 used for classification by malicious entity 169 is unable to correctly classify the AI-resistant verification image 142 that is presented by AI-resistant image-identification CAPTCHA 144. That is, malicious entity 169 encounters the AI-resistant verification image 142 and attempts to determine the appropriate response to the CAPTCHA query provided the AI-resistant image-identification CAPTCHA 144, but the adversarial perturbations result in the AI unit 112 providing an incorrect classification for the image, and therefore cause the malicious entity 169 to provide an incorrect CAPTCHA response. As a result, the malicious entity 169 employing AI unit 112 is unable to access the services and applications provided by server 110.

FIG. 2 illustrates image database 130 server 110 with AI-resistant CAPTCHA generator 195 of FIG. 1 that is used to generate AI-resistant verification images 142 in accordance with some embodiments. Server 110 includes a central processing unit (CPU) 274, a graphical processing unit (GPU) 294, and a memory 280. GPU 294 includes an AI-resistant CAPTCHA generator 195 that is configured to generate the AI-resistant verification image 142 using a pixel-by-pixel bounds. The pixel-by-pixel bounds is a bounds (i.e., maximum and minimum limitation) on the adversarial perturbation that is added to each pixel of the source image 196. In some embodiments, AI-resistant CAPTCHA generator 195 is implemented in hardware or software. In some embodiments, AI-resistant CAPTCHA generator 195 is implemented in CPU 274. Alternatively, in some embodiments AI-resistant CAPTCHA generator 195 is implemented as a separate block (such as an FPGA). Image database 130 is configured to include source images 196 that are utilized to generate AI-resistant verification image 142 of AI-resistant image-identification CAPTCHA 144 are developed using a database of known images. For example, AI-resistant verification image 142 is constructed using source images accessed from, for example, ImageNet or CityScapes.

In various embodiments, CPU 274 or GPU 294 is configured to execute operations for the server 110, including generation of the AI-resistant verifications images 142, as described herein. It will be appreciated that, although the CPU 274 and GPU 294 are illustrated as single processors, in some embodiments the CPU 274 and GPU 294 each represent multiple processing units, with each processing unit including one or more processor cores or other compute units. For example, in at least one embodiment the CPU 274 represents at least one CPU having multiple processor cores and the GPU 294 represents at least one GPU having multiple single-instruction multiple data (STMD) compute units configured to execute graphical operations.

Some embodiments of the GPU 294 are used for general purpose computing. In the illustrated embodiment, the GPU 294 implements multiple processing elements (not shown in FIG. 2 in the interest of clarity) that are configured to execute instructions concurrently or in parallel. In the illustrated embodiment, the CPU 274 and the GPU 294 communicate with the memory 280 over a bus (not shown). However, some embodiments of the GPU 294 communicate with the memory 280 over a direct connection or via other bridges, switches, routers, and the like. The GPU 294 executes instructions stored in the memory 280 and stores information in the memory 280 such as the results of the executed instructions. For example, the memory 280 stores a copy of instructions from a program code that is to be executed by the GPU 294. As described further herein, both CPU 274 and GPU 294 are configured to execute instructions, which include the instructions used to generate the AI-resistant verification image 142 described below.

In order to generate the AI-resistant verification image 142 of AI-resistant image-identification CAPTCHA 144 (depicted in FIG. 1), AI-resistant CAPTCHA generator 195 is configured to use a pixel-by-pixel bounds to generate the AI-resistant verification image 142. As stated previously, the pixel-by-pixel bounds is a bounds (i.e., maximum and minimum limitation) on the adversarial perturbation that is added to each pixel of the source image 196. The pixel-by-pixel bounds is based on the principles of human vision and the limitations of AI image detection capabilities with regards to adversarial attacks. Adversarial attacks are a process or processes that change the solution or classifier output of a learning system. To be generally useful, many adversarial attacks must also be imperceptible to the human eye, or humans might detect and foil the attack. The process of human vision begins with photons from the visual field striking the retina. The retina is composed of photoreceptors that are spectrally sensitive, where the photoreceptors are activated based on the wavelength of light that impinges the photoreceptors. Based on the wavelength of light photons incident from different parts of the visual field during a saccade, different numbers of various types of photoreceptors respond, which allows higher regions of the visual pathway to determine the colors being seen, the object being detected, and the like.

The ratio of the largest to smallest amount of light intensity (i.e., dynamic range) that the human visual system can perceive is large (approximately $10^{11}$ of ambient light). This perception is performed by adjusting the sensitivity of the photoreceptors of the human visual system based on the background light level, which leads to the notion of a "just noticeable difference" (JND) in the change in stimuli that can be perceived. The JND is governed by what is known as Weber's Law or the Weber-Fechner relation. The Weber-Fechner relation states that the perceived intensity is proportional to the logarithm of the actual intensity. Thus, in some embodiments, perception is represented as $$p = k\ln\left(\frac{S}{S_0}\right), \text{ with } S < (1+\mu)S_0, \ln\left(\frac{S}{S_0}\right) < \ln(1+\mu).$$

If an intensity change threshold, $p=\ln(1+\mu)$ is defined as a threshold below which humans cannot perceive, then, in some embodiments, "invisible perturbations" are constructed (by the AI-resistant CAPTCHA generator 195 as shown below) based on the Weber-Fechner relation that would formally be difficult or even impossible for a human eye to detect.

In various embodiments, the process for generating AI-resistant verification images 142 includes AI-resistant CAPTCHA generator 195 providing the pixel-by-pixel bounds (i.e., a bounds on each pixel) of the perturbed image S as:

$$S_{min} < S < S_{max}$$

with $$S_{min} = \frac{S_0}{1+\mu}$$

and $$S_{max} = (1+\mu)S_0$$

where µ is a threshold stimuli and the pixel-by-pixel bounds described above is utilized to generate the human-invisible perturbed AI-resistant verification image 142.

For example, during operation, in order to facilitate generation of the AI-resistant verification image 142, AI-resistant CAPTCHA generator 195 receives the input image $S_0$, and determines an initial value of µ that is required to solve for $S_{min}$ and $S_{max}$. In various embodiments, the initial value of µ is determined using a table of µ values (not shown) indicative of threshold values below which a human eye cannot perceive changes in the light intensity of the image $S_0$.

Based on the selected value of µ and the input image $S_0$ received by AI-resistant CAPTCHA generator 195, AI-resistant CAPTCHA generator 195 determines the values of $S_{min}$ and $S_{max}$ using $$S_{min} = \frac{S_0}{1+\mu} \text{ and } S_{max} = (1+\mu)S_0.$$

After AI-resistant CAPTCHA generator 195 determines the pixel-by-pixel bounds, AI-resistant CAPTCHA generator 195 generates an initial AI-resistant verification image S. That is, after AI-resistant CAPTCHA generator 195 of GPU 294 receives the input image $S_0$, AI-resistant CAPTCHA generator 195 generates S using the equation:

$$S = S_0 + \eta$$

where $S_0$ is the input image from image database 130 and η is the adversarial perturbation that is added to the input source image $S_0$ by AI-resistant CAPTCHA generator 195.

In some embodiments, in order to generate an initial adversarial perturbation η of AI-resistant verification image 142, the AI-resistant CAPTCHA generator 195 uses, for example, a standard adversarial perturbation generation method such as, the Fast Gradient Sign Method (FGSM). As is known in the art, given an image classification network with parameters θ and loss J(θ, x, y)), the FGSM is used to generate the adversarial perturbation η by taking the sign of the gradient J(θ, x, y)), where x is the input image $S_0$, y is the label of x, and ϵ represents the size of the perturbation.

$$\eta = \epsilon \text{ sign}(\Delta_x J(\theta,x,y))$$

The output of the FGSM method is an adversarial perturbation η that is used to generate the initial image $S_{init}$ using $S=S_{0+i}$. After solving for the initial AI-resistant verification image $S_{init}$, AI-resistant CAPTCHA generator 195 determines whether the initial AI-resistant verification image $S_{init}$ is within the pixel-by-pixel bounds, i.e., $S_{min}$ and $S_{max}$, by comparing S to the $S_{min}$ and $S_{max}$ values. In one embodiment, when AI-resistant CAPTCHA generator 195 determines that $S_{init}$ is within the pixel-by-pixel bounds, $S_{init}$ is output by AI-resistant CAPTCHA generator 195 as the AI-resistant verification image 142. When, for example, AI-resistant CAPTCHA generator 195 determines that $S_{init}$ is not within $S_{min}$ and $S_{max}$, AI-resistant CAPTCHA generator 195 adjusts the pixel values of $S_{init}$ to reside within the pixel-by-pixel bounds by determining a new Weber-based adversarial perturbation $\eta_{weber}$ and a new Weber-based AI-resistant verification image 142 $S_{Weber}$ that is based on µ. In one embodiment, for example, when AI-resistant CAPTCHA generator 195 determines that $S_{init}$ is above $S_{max}$, AI-resistant CAPTCHA generator 195 determines the adversarial perturbation using $$\eta_{Weber} = S_{Weber} - S_{init}$$

where $$S_{Weber} = \frac{(S_{max} + S_{min})}{2}$$

$S_{Weber}$ is the AI-resistant verification image 142 output by AI-resistant CAPTCHA generator 195. After AI-resistant CAPTCHA generator 195 generates AI-resistant verification image 142, server 110 provides the AI-resistant verification image 142 over network 140 to as part of the AI-resistant image-identification CAPTCHA 144 to computing device 106.

As a result of using the pixel-by-pixel bounds to generate the AI-resistant verification image 142, the AI unit 112 of computing device 106 is unable to correctly classify the AI-resistant verification image 142 in the AI-resistant image-identification CAPTCHA 144. Thus, server 110 is protected from the unauthorized access by AI unit 112 using the AI-resistant verification image 142 generated based on the Weber-Fechner relation. That is, by modifying existing adversarial perturbations based on the Weber-Fechner relation, contrast of the source image 196 is maintained below the bound known to trigger human detection.

FIG. 3 illustrates a method 300 for generating artificial intelligence resistant verification images 142 in the network environment of FIG. 1 and FIG. 2 in accordance with some embodiments.

Method 300 commences at block 310 with reference to FIGS. 1-2. At block 305, a source image 196 is retrieved by server 110 from image database 130. At block 310, AI-resistant CAPTCHA generator 195 determines a threshold stimuli µ based on a table of µ values indicative of threshold values below which a human eye cannot perceive changes in the light intensity of the source image 196 (i.e., the Weber-Fechner relation). At block 315, based on the threshold stimuli µ and the source image 196, AI-resistant CAPTCHA generator 195 determines the pixel-by-pixel bounds ($S_{min}$ and $S_{max}$) for each pixel of the source image 196. At block 320, AI-resistant CAPTCHA generator 195 generates an initial adversarial perturbation and corresponding verification image using a standard adversarial generation technique, such as, for example, the Fast Gradient Sign Method (FGSM), the Deep Fool Method (DFM), or the Jacobian-based Saliency Map Attack (JSMA). At block 325, a determination is made by AI-resistant CAPTCHA generator 195 as to whether the verification image and the adversarial perturbation reside within the pixel-by-pixel bounds. Based on whether the verification image and the adversarial perturbation reside within the pixel-by-pixel bounds, AI-resistant CAPTCHA generator 195 adjusts the verification image and corresponding adversarial perturbations to reside within the pixel-by-pixel bounds ($S_{min}$ and $S_{max}$). At block 330, the AI-resistant verification image 142 is generated by AI-resistant CAPTCHA generator 195 based on the adjustment of the verification image and the adversarial perturbations. At block 335, AI-resistant CAPTCHA generator 195 provides the AI-resistant verification image 142 to AI-resistant image-identification CAPTCHA 144 to prevent unauthorized access to the applications provided by server 110.

In various embodiments, additionally, it should be recognized that the processes described herein to generate the AI-resistant verification images 142 are not limited to human vision. The Weber-Fechner relation also relates to animal vision and would have similar impact on a variety of artificial vision systems, such as cameras. In various embodiments, an iterative approach, such as, for example, a quadratic program is used to find the adversarial perturbation as close to possible to an optimal perturbation that maps to an optimal S that lies within the pixel-by-pixel bounds, $S_{min}$ and $S_{max}$.

In some embodiments, the apparatus and techniques described above are implemented in a server including one or more integrated circuit (IC) devices (also referred to as integrated circuit packages or microchips), such as in the server described above with reference to FIGS. 1-3. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

Embodiments of the present disclosure include methods for generating adversarial perturbations which fool networks (e.g., pre-trained CNNs) while being substantially visually imperceptible to the human eye. Generally, the methods for generating adversarial perturbations include generate misclassifications for image recognition tasks and measuring noticeable difference of the images with and without perturbations by the human eye to generate human-friendly, AI-resistant verification images. As used herein, the term "verification image" refers to any image-based mechanism by which a query is issued to elicit an answer from an end user that enables determinization of whether the end user is a human.

In some embodiments, the verification image refers to a CAPTCHA displaying text as a graphic (which is partially obscured and/or distorted) and requires the end user to respond with numerical digits and/or text characters. In other embodiments, the verification image refers to a reCAPTCHA displaying known and unknown graphic words simultaneously for solving for unknown tests through end user input. If the end user successfully identifies the known word, the end user's answer for the unknown word is used by the reCAPTCHA system to "solve" the unknown word.

CAPTCHAs and reCAPTCHAs have been used to prevent spam and abuse. These image verification systems use distorted images of text that an end user needs to identify or employ image-identification tasks, along with behavioral analysis techniques, to determine whether the interacting entity is a human or a bot. CAPTCHA-based systems have become increasingly difficult for humans to use due to an arms-race against AI techniques that can extract the relevant features from images to evade detection by CAPTCHA and other challenge-response tests.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method at least partially controlled by a computing device, the method comprising:
    determining pixel-by-pixel bounds for a perturbed image of a source image;
    generating an adversarial example;
    modifying, based on the pixel-by-pixel bounds, the adversarial example to generate the perturbed image; and
    providing the perturbed image to a server that is configured to provide the perturbed image as part of a verification image.

2. The method of claim 1, wherein:
    generating the adversarial example includes generating an initial perturbed image using an adversarial example generation technique.

3. The method of claim 2, further comprising:
    determining whether the initial perturbed image resides within the pixel-by-pixel bounds.

4. The method of claim 3, further comprising:
    when the initial perturbed image does not reside within the pixel-by-pixel bounds, adjusting the initial perturbed image by a Weber-Fechner based adversarial perturbation to reside within the pixel-by-pixel bounds.

5. The method of claim 4, wherein:
    the Weber-Fechner based adversarial perturbation is equivalent to a difference between a Weber-Fechner based perturbed image and the initial perturbed image.

6. The method of claim 5, wherein:
    the Weber-Fechner based perturbed image is equivalent to an average of a maximum threshold value of the pixel-by-pixel bounds and a minimum threshold value of the pixel-by-pixel bounds.

7. The method of claim 6, wherein:
    the maximum threshold value of the pixel-by-pixel bounds and the minimum threshold value of the pixel-by-pixel bounds are determined using a threshold stimuli and the source image.

8. The method of claim 1, wherein:
    the adversarial example is generated using at least one of a Fast Gradient Sign Method (FGSM), a Deep Fool Method (DFM), or a Jacobian-based Saliency Map Attack (JSMA).

9. The method of claim 1, wherein:
    the pixel-by-pixel bounds are based on limitations of human visual perception.

10. A non-transitory computer readable medium embodying a set of executable instructions to manipulate one or more processors to perform operations comprising:
    determining pixel-by-pixel bounds for a perturbed image;
    generating an adversarial example;
    modifying, based on the pixel-by-pixel bounds, the adversarial example to generate the perturbed image; and
    providing the perturbed image to an image-based classification system.

11. The non-transitory computer readable medium of claim 10, the operations further comprising:
    generating the adversarial example includes generating an initial perturbed image using an adversarial example generation technique.

12. The non-transitory computer readable medium of claim 11, the operations further comprising:
    determining whether the initial perturbed image resides within the pixel-by-pixel bounds.

13. The non-transitory computer readable medium of claim 12, the operations further comprising:
    when the initial perturbed image does not reside within the pixel-by-pixel bounds, adjusting the initial perturbed image by a Weber-Fechner based adversarial perturbation to reside within the pixel-by-pixel bounds.

14. The non-transitory computer readable medium of claim 13, wherein:
    the Weber-Fechner based adversarial perturbation is equivalent to a difference between a Weber-Fechner based perturbed image and the initial perturbed image.

15. The non-transitory computer readable medium of claim 14, wherein:
    the Weber-Fechner based perturbed image is equivalent to an average of a maximum threshold value of the pixel-by-pixel bounds and a minimum threshold value of the pixel-by-pixel bounds.

16. The non-transitory computer readable medium of claim 15, wherein:
    the maximum threshold value of the pixel-by-pixel bounds and the minimum threshold value of the pixel-by-pixel bounds are determined using a threshold stimuli and a source image.

17. The non-transitory computer readable medium of claim 16, wherein:
    the adversarial example generation technique includes using at least one of a Fast Gradient Sign Method (FGSM), a Deep Fool Method (DFM), or a Jacobian-based Saliency Map Attack (JSMA).

18. The non-transitory computer readable medium of claim 10, wherein:
    the pixel-by-pixel bounds are based on limitations of human visual perception.

19. An apparatus, comprising:
    a memory storing instructions;
    one or more processors that, in response to receiving the instructions, are configured to:
        determine pixel-by-pixel bounds for a perturbed image of a source image;
        generate an adversarial example;
        modify, based on the pixel-by-pixel bounds, the adversarial example to generate the perturbed image; and
        provide the perturbed image in an image-based Completely Automated Public Turing Test to tell Computers and Humans Apart (CAPTCHA).

20. The apparatus of claim 19, wherein:
    in response to receiving the instructions, the one or more processors are configured to:
        in response to detecting that an initial perturbed image does not reside within the pixel-by-pixel bounds, adjust the initial perturbed image to generate the perturbed image by a Weber-Fechner based adversarial perturbation to reside within the pixel-by-pixel bounds.

* * * * *